Sept. 27, 1938.   G. SPATTA   2,131,237
AXLE HOUSING AND METHOD OF MAKING SAME
Filed Oct. 11, 1935   3 Sheets-Sheet 1
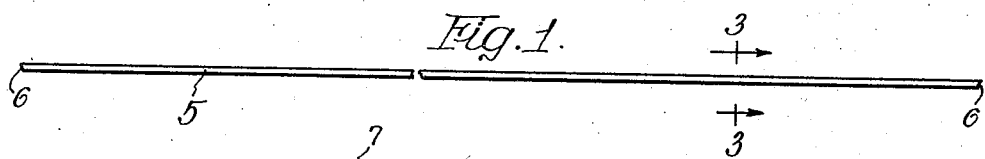
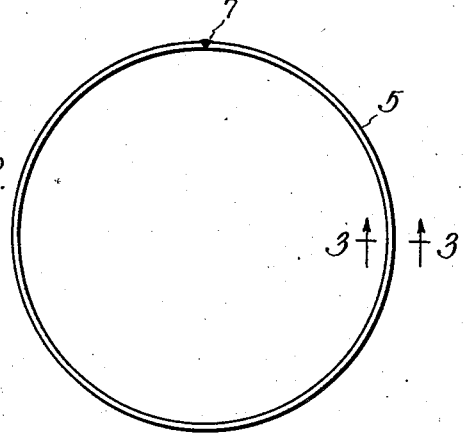
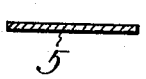
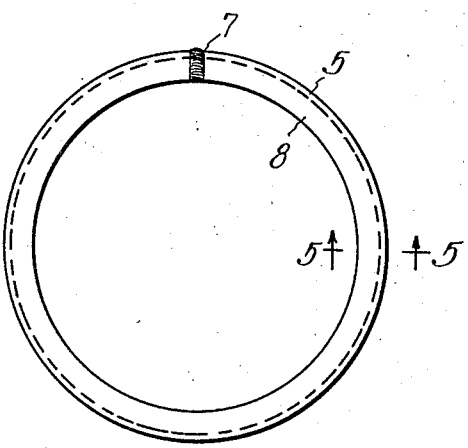
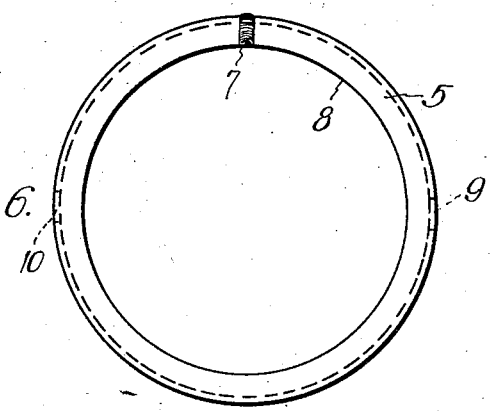
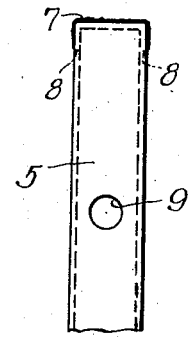
Inventor:
George Spatta Sept. 27, 1938. G. SPATTA 2,131,237
AXLE HOUSING AND METHOD OF MAKING SAME
Filed Oct. 11, 1935 3 Sheets-Sheet 2
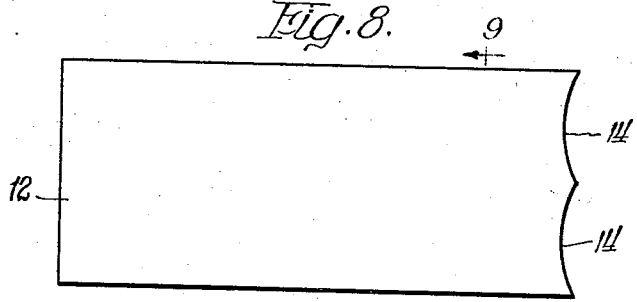
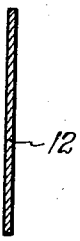
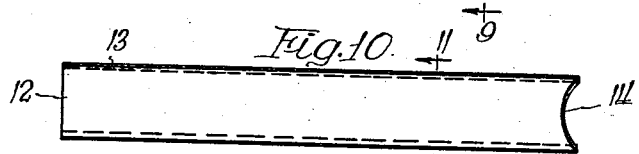
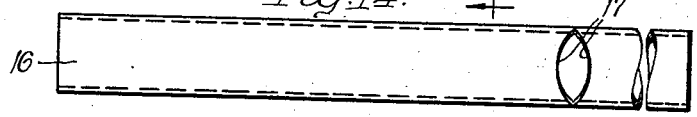
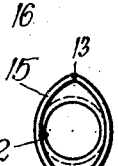
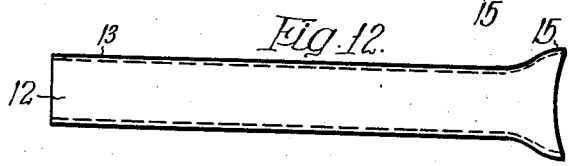
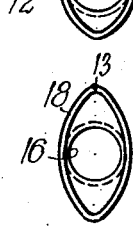
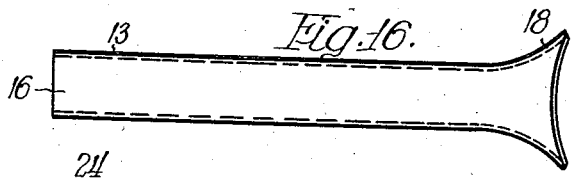
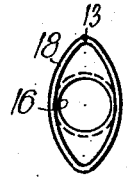
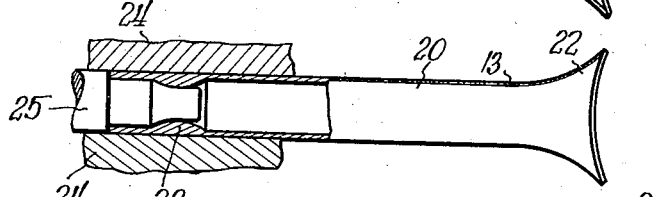
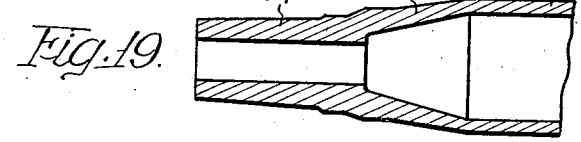
Inventor:
George Spatta
By Brown Jackson Boettcher Dienner
Attys.

Sept. 27, 1938.  G. SPATTA  2,131,237
AXLE HOUSING AND METHOD OF MAKING SAME
Filed Oct. 11, 1935   3 Sheets-Sheet 3
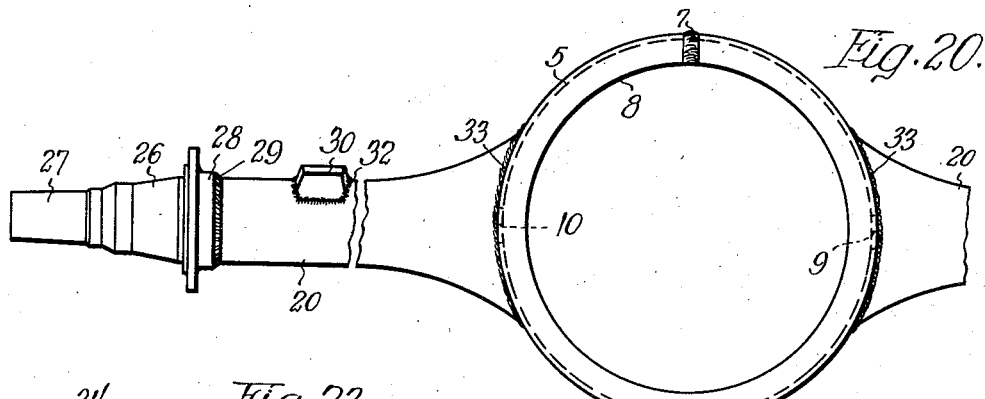
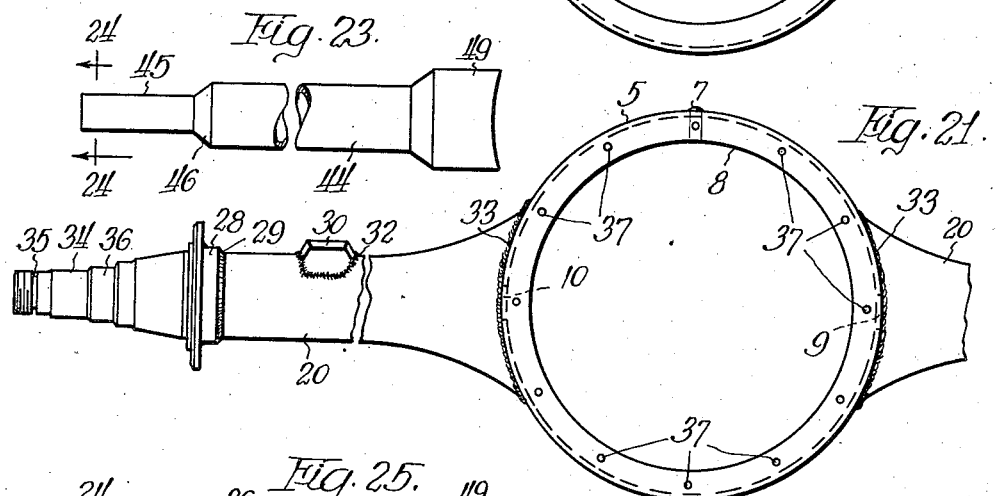
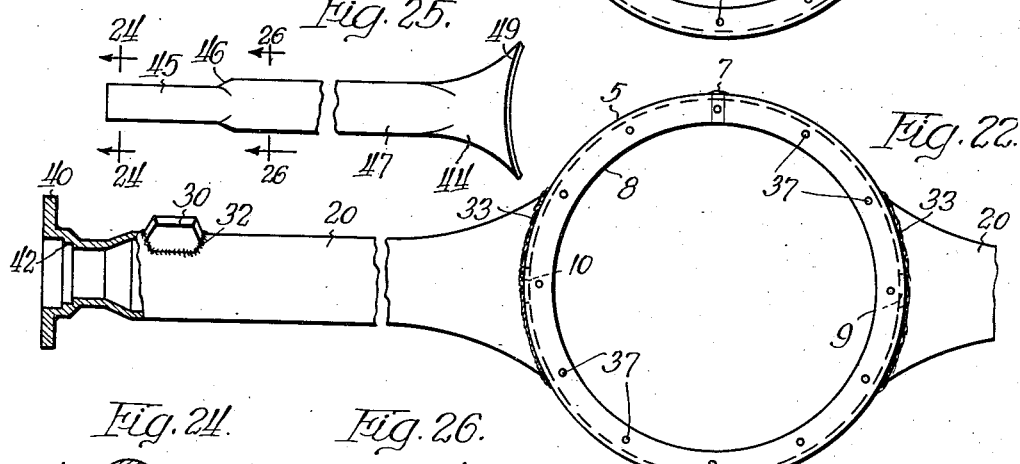
Inventor
George Spatta Patented Sept. 27, 1938

2,131,237

UNITED STATES PATENT OFFICE 2,131,237

AXLE HOUSING AND METHOD OF MAKING SAME

George Spatta, Buchanan, Mich., assignor to Clark Equipment Company, Buchanan, Mich., a corporation of Michigan Application October 11, 1935, Serial No. 44,477

8 Claims. (Cl. 29—153.1)

This invention relates to axle housings and the method of forming the same, and is more particularly directed to rear axle housings for trucks, busses, passenger cars and the like.

It has been customary in this particular art to form each axle housing with a central differential housing and extending arms of tubular construction through which the axles extend to the wheels. One manner in which such housings have been formed is by slotting and expanding the central portion of a seamless tube or welded blank and subsequently swaging the oppositely extending arm portions to form radially extending flanges or to form reduced arms having thickened bearing seats at the outer extremities of these arms. The broad concept of forming a housing in this manner is shown and described in my Patent No. 1,926,353 of September 12, 1933.

Another manner in which such housings have been formed, especially housings for use with passenger cars and the like, is by the stamping of two plate members into U-shaped channel pieces having centrally arched portions, these U-shaped members being welded along longitudinal seams to form an enclosed tubular type housing. This method of forming rear axle housings is shown in the patent to Eisele, No. 1,991,199 of February 12, 1935.

The present invention contemplates a radical departure from these previous teachings and is directed to an axle housing formed by a method that will produce economy in time and labor and will facilitate the assembling of the component parts of the housing and working of the individual parts. At the same time housings constructed in accordance with the present invention have the distinct advantage of an exceptionally strong differential casing.

Broadly stated the present invention comprises rolling a flat plate or strip into a central hoop, flanging the pripheral edges of the hoop to form a differential casing, preferably of the banjo type, and then welding preformed tubular arms to opposite sides of the hoop.

One object of the present invention is to form an axle housing in which the differential casing is formed independently of the tubular arms and these arms are welded to the external surface of the central casing.

Another object of the present invention is to provide a housing in which only relatively small openings are provided between the differential casing and the interior of the tubular arms.

Still another feature of the present invention is to provide a housing in which the arms may be swaged and formed to the desired size and shape prior to assembly of the arms onto the differential casing.

Another feature of the present invention is to provide an increased area of weld between each of the arms and the central casing to insure maximum strength at this portion of the housing.

One advantage secured by the present construction is the extension of the belled ends of the arms into substantial tangency with the external annular surface of the central hoop whereby no undue shearing stresses are produced between the differential housing and the welded edges of the arms.

Other objects and advantages of the present invention will appear more fully from the following detailed description which, taken in connection with the accompanying drawings, will disclose to those skilled in the art the particular construction and method employed in the present invention.

In the drawings:

Figure 1 is a side elevational view of a flat plate member employed for forming the central differential casing;

Figure 2 shows the plate of Figure 1 rolled into hoop form with the abutting ends thereof welded;

Figure 3 is a sectional view taken on line 3—3 of Figure 2;

Figure 4 shows the step of providing internal flanges at the opposite edges of the hoop shown in Figure 2;

Figure 5 is a sectional view taken substantially on line 5—5 of Figure 4;

Figure 6 shows the central housing provided with oppositely disposed openings through which the axles of the drive mechanism are to extend;

Figure 7 is an end elevation of the housing shown in Figure 6;

Figure 8 is a plan view of a flat plate member which may be employed for forming the extending arms of the axle housing;

Figure 9 is a sectional view of the plate of Figure 8;

Figure 10 shows the plate rolled into tubular form and welded along its longitudinal seam;

Figure 11 is a sectional view taken on line 11—11 of Figure 10;

Figure 12 shows the tube of Figure 10 with one end thereof belled outwardly;

Figure 13 is an end view of the tube shown in Figure 12;

Figure 14 shows an optional method in which both arms may be formed from the same tube;

Figure 15 is a section taken on line 15—15 of Figure 14;

Figure 16 shows the use of a seamless tube with its end belled outwardly;

Figure 17 is an end elevation of the seamless tube shown in Figure 16;

Figure 18 shows the initial step for forming reduced bearing seats on the opposite ends of the tubular arms;

Figure 19 shows the completed swaging operations on this end of the arm;

Figure 20 shows the arm of Figure 19 welded to the differential housing end with the spring pad and brake plate attached thereto;

Figure 21 shows the completed housing;

Figure 22 shows a completed housing of the passenger car type formed in the same manner;

Figure 23 illustrates a modified manner of forming the arm;

Figure 24 is a sectional view taken on lines 24—24 of Figures 23 and 25;

Figure 25 shows the swaging of a cylindrical arm into an arm having a rectangular section; and Figure 26 is a sectional view through a rectangular arm taken on line 26—26 of Figure 25.

Referring now in detail to the drawings, the plate 5 shown in Figure 1 which may comprise a flat strip of boiler plate or the like which is initially rolled into the circular form shown in Figure 2 and has its beveled ends 6 disposed in suitable abutting engagement and welded together as indicated at 7.

The hoop of Figure 2 is then placed in a standard type of flanging machine and the annular edges thereof are turned inwardly as indicated at 8 to provide suitable bolting flanges for the back plate and differential carrier mounting.

The flanged circular housing of Figure 4 is then placed in any suitable type of punching machine such as a horn punch and the opposite axle openings 9 and 10 are formed in the web portion of the casing. It will be noted that the openings 9 and 10 are of relatively small diameter whereby suitable bearing means, or if desired, packing means or gasket means may be introduced, for preventing communication between the central housing 5 and the extending tubular arms. Such a construction is desirable in case a hydraulic differential drive is employed in place of the standard differential drive now in use.

The tubular arms for mounting the wheels are formed as shown in Figures 8 to 13, being formed from a flat plate member 12 which is rolled into cylindrical form such as shown in Figure 10 and welded along its longitudinal seam as indicated at 13. If desired one end of the blank 12 may be scalloped as indicated at 14 to provide the inwardly extending arcuate portions at the end of the cylindrical tube portion in Figure 10. This facilitates to some extent the belling of the tubular member 12 into the form shown in Figure 12, in which the end thereof is forced outwardly by means of a suitable mandrel to form the oval bell shaped section 15.

If desired a flat plate member or a seamless tubular blank of substantially twice the longitudinal extent of the blank 12 may be employed as indicated at 16 in Figure 14. Such a blank can be provided at its center with transversely extending slots 17 whereby it may be expanded or belled outwardly by engagement with the slotted portions thereof to provide the belled end sections such as shown at 18 in Figure 16. Thus the belling operation for both the tubes may be completed in one step if tubular blanks such as the blank 16 are employed, and a double-ended expanding mandrel is employed. Obviously, however, shorter lengths of individual seamless tubing may be used and may be belled individually as previously described. It is optional whether a welded cylindrical blank or a seamless tubular blank is employed for forming the arm sections.

In Figures 18 and 19 I disclose the method of forming suitable bearing seats at the opposite end of the blank such as the blank 20, which may be previously belled as indicated at 22 in any suitable manner. In this end forming operation a suitable punch is first inserted axially in the opposite end of the tube to force the metal internally thereof and axially rearwardly of the blank to produce a thickened internal shoulder 23. During this operation the end of the blank 20 is rigidly held in suitable die blocks 24. A punch for producing this displacement is indicated diagrammatically at 25.

Subsequent operations in forming the end of the blank comprise swaging the external surface inwardly adjacent the thickened portion to provide the frusto conical section 26 adjacent the thickened shoulder 23 and to provide a thickened bearing portion 27 having an external diameter substantially less than the external diameter of the blank 20. The details of such forming operations are described in the Mogford and Spatta Patent No. 1,978,685, issued October 30, 1934. When each of the tubes or arms has been formed in this manner suitable brake plates 28 are slipped over the ends thereof and attached to the cylindrical portion of the arm 20 adjacent the frusto-conical portion 26. The plates 28 may be secured to the arms by welding or the like as indicated at 29. Similarly, spring pads 30 are secured to the arms inwardly of the plates 28 by means of welding as shown at 32. The belled ends of the arms are then trimmed in any suitable machine to fit closely about the external curved surface of the central casing 5 and are aligned axially of the openings 9 and 10 in the housing 5 by any suitable means. The peripheral edges at the ends of the arms 20 are then welded to the central casing 5 as indicated at 33 to rigidly join the arms to the central housing.

It will be noted that the belled portion of the arms 20 extends outwardly into substantially tangential relation with respect to the web portion of the housing 5 whereby the stresses produced tend to impose longitudinal tension and compression stresses on the metal of the central housing whereby substantially no shearing stresses are produced along the welded joint.

After the arms have been joined to the central housing in the manner shown in Figure 20 the entire housing, including the arms, the brake plates and the spring pads, is heat-treated by heating the same up to a temperature of from 1525° to 1575° F. and then quenching the same, after which the entire housing is reheated up to approximately 925 F. and then allowed to cool. This heat treatment removes any defects or imperfections introduced by the welding operations and makes the housing approach a substantially homogeneous mass of metal in which no parts have been weakened by the heat introduced in welding.

The ends of the arms 20 are then machined to final form as shown in Figure 21 to provide a bearing seat 34, an oil groove 35, and an oil retainer surface 36. At the same time the flanges 8 of the central housing 5 are tapped at spaced intervals, as indicated at 37, to receive the bolts for securing the differential carrier mechanism and back plate thereto.

If desired, the outer ends of the arms 20 may be forged or upset to provide thickened radially extending flanges 40 on which brake plates or the like may be mounted and the interior of the ends 20 may be suitably machined after heat treatment of the housing to provide bearing seats 42. Such forming operations are described in detail in my copending application, Serial No. 534,747, filed May 4, 1931. The housing shown in Figure 22 is especially adapted for use in passenger cars or the like.

If desired a tubular blank such as the blank 44 of Figure 23, which is initially swaged down to thicken the same and produce some elongation thereof, may have its end portion further swaged to form a cylindrical end 45 of reduced external diameter and joined to the intermediate reduced portion of the blank by the frusto-conical section 46. A subsequent swaging operation may then be employed for converting the intermediate cylindrical portion of the arm 44 into the rectangular portion 47 whereby the arm is provided with increased strength without any corresponding increase in size as shown in Figure 26. The swaging operation for forming this intermediate rectangular section is described in detail in my copending application, Serial No. 39,666, filed September 9, 1935. This portion 47 of the arm has its vertical extent greater than the horizontal extent in order to provide an increased moment of inertia and the swaging operation also produces an increased density of metal in the corners of the section as shown at 48 which is of distinct value in preserving the strength of the section. The reduced end of the arm 44, an indicated at 45, may then be upset to form radially thickened flanges, as shown at 40 in Figure 22, or may be further reduced and thickened to form wheel bearing seats, as indicated in Figure 19. It is obvious that the arm 44 may be thus further worked after the formation of the intermediate rectangular portion, and no illustration of such further steps is deemed necessary. The end 49 of such a blank is then belled and trimmed in any suitable manner and joined to the central housing 5.

It is therefore believed apparent that I have provided a novel type of axle housing which provides for economy in formation and facilities assembly in that the relative lengths of tube are much easier to handle during the forging operations than the tubes used in forming a one-piece expanded type housing.

I do not intend to limit my invention to the exact structure disclosed or to the precise steps described in the formation of the housing inasmuch as these may be widely varied. The invention is therefore to be limited only as defined by the scope and spirit of the appended claims.

I claim:—

1. The method of making a rear axle housing which comprises rolling a flat strip into a hoop, butt welding the adjacent ends of said strip, forming inturned flanges at opposite sides of said hoop, punching diametrically opposed axle openings in the web of said hoop, forming a pair of tubular arms, belling out one end of each of said arms to bring them into substantial tangency with the external surface of said hoop, and welding the belled ends of said arms to the cylindrical surface of said hoop about said openings with the axes of said arms extending normal to the axis of revolution of said cylindrical surface to which said ends are welded.

2. The method of making a rear axle housing which comprises rolling a flat strip into a hoop, forming inturned flanges at opposite sides of said hoop, punching diametrically opposed axle openings of a size substantially equal to the diameter of an axle spindle in the web of said hoop, forming a pair of tubular arms, belling out one end of each of said arms into an oval shape having an axial curvature of substantially the same radius as said hoop, forming a thickened radial flange at the opposite ends of each of said arms, and welding the belled ends of said arms to the cylindrical surface of said hoop about said openings.

3. The method of making a rear axle housing which comprises rolling a flat strip into a hoop, forming inturned flanges at opposite sides of said hoop, punching diametrically opposed axle openings of a diameter such as to receive an axle spindle in the web of said hoop, forming a pair of tubular arms, belling out one end of each of said arms so that the defining edges thereof are of the same curvature as said hoop, forming the intermediate portions of said arms into rectangular section, forming reduced and thickened bearing portions at the opposite ends of said arms, and welding the edges of said belled ends of said arms to the cylindrical surface of said hoop about said openings with the axes of said arms extending normal to the axis of generation of the surface of said hoop to which said edges are welded.

4. The method of making a rear axle housing which comprises rolling a flat strip into a hoop, forming inturned flanges at opposite sides of said hoop, punching diametrically opposed axle openings in the web of said hoop, forming a pair of tubular arms, belling out one end of each of said arms to bring them into substantial tangency with the external surface of said hoop, forming thickened radial upset flanges at the opposite ends of said arms, and welding the edges of the belled ends of said arms to the cylindrical surface of said hoop about said openings with the axes of said arms extending normal to the axis of generation of the surface of said hoop to which said edges are welded.

5. As an article of manufacture, a rear axle housing comprising a rolled central differential casing having an uninterrupted external cylindrical surface provided with diametrically opposed openings, and a pair of tubular arms on opposite sides of said casing and extending normal to the axis thereof, said arms having belled ends adjacent said casing of oval concave shape fitting said external surface of said casing, and welded directly thereto about said openings.

6. An axle housing comprising a central portion formed from a flat strip and rolled into a cylindrical casing, and a pair of hollow arms having belled end sections secured directly to the external annular surface of said strip, each of said end sections extending about and enclosing substantially one-sixth of the total circumferential surface of said casing and terminating substantially tangent to said casing.

7. In the method of forming an axle housing, the novel steps comprising cutting a rectangularly shaped blank with a pair of laterally spaced arcuately shaped notches in one end thereof, rolling said blank into a tube and welding it longitudinally along the meeting edges, belling out said notched end to form an outwardly flared arcuately dished portion, providing a cylindrical peripherally flanged differential casing, and welding the defining edge of said flared portion to the external annular surface of said casing.

8. In the method of forming a three-piece axle housing, the novel procedure comprising rolling a sheet of flat stock into a hoop, butt-welding the meeting edges, punching diametrically opposed openings in said hoop, forming inturned peripheral flanges on said hoop, and forming a pair of housing arms, each arm being formed by cutting a rectangular blank from flat stock with a pair of inwardly arched arcuate notches in one end thereof, forming said blank into a tube, belling out said notched end to form an outwardly flaring oval-shaped inwardly dished portion, and welding the defining edges of each of said portions to the external annular surface of said hoop about the respective openings in said hoop.

GEORGE SPATTA.